US008422612B2

United States Patent
Ide et al.

(10) Patent No.: US 8,422,612 B2
(45) Date of Patent: Apr. 16, 2013

(54) COMMUNICATION TERMINAL APPARATUS, COMMUNICATION APPARATUS, AND SIGNAL RECEIVING METHOD

(75) Inventors: Satoshi Ide, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 871 days.

(21) Appl. No.: 12/382,680

(22) Filed: Mar. 20, 2009

(65) Prior Publication Data

US 2009/0225914 A1  Sep. 10, 2009

Related U.S. Application Data

(63) Continuation of application No. PCT/JP2007/056268, filed on Mar. 26, 2007.

(30) Foreign Application Priority Data

Sep. 21, 2006  (WO) .................. PCT/JP2006/318776

(51) Int. Cl.
*H04B 1/10* (2006.01)
*H04L 27/00* (2006.01)
*H04B 10/06* (2006.01)

(52) U.S. Cl.
USPC ............ 375/354; 375/348; 375/316; 398/214

(58) Field of Classification Search .................. 375/354, 375/348, 316; 398/214
See application file for complete search history.

(56) References Cited

U.S. PATENT DOCUMENTS

| 5,287,389 A * | 2/1994 | Ichibangase et al. ......... 375/365 |
| 6,044,122 A * | 3/2000 | Ellersick et al. ............... 375/360 |

(Continued)

FOREIGN PATENT DOCUMENTS

| JP | 61-101142 | 5/1986 |
| JP | 8-8954 | 1/1996 |

(Continued)

OTHER PUBLICATIONS

International Search Report for International Application No. PCT/JP2007/056268, mailed Jun. 12, 2007.

*Primary Examiner* — Shuwang Liu
*Assistant Examiner* — Nader Bolourchi
(74) *Attorney, Agent, or Firm* — Staas & Halsey LLP

(57) ABSTRACT

A communication terminal apparatus receives a management signal at a bit rate A and a data signal at a bit rate B (B=A×M) through the same line. The communication terminal apparatus includes a signal regenerating unit, a management signal converting unit, a timing control unit, and a data signal obtaining unit. The signal regenerating unit regenerates a signal transmitted through the line as a signal of a bit rate C (C=A× N). The management signal converting unit converts N bits of the regenerated signal into the management signal of one bit. The timing control unit controls timing for obtaining a data signal based on the management signal. The data signal obtaining unit obtains the data signal according to timing control of the timing control unit.

20 Claims, 16 Drawing Sheets

U.S. PATENT DOCUMENTS

| | | | |
|---|---|---|---|
| 6,072,609 A | 6/2000 | Masuda | |
| 6,826,371 B1 * | 11/2004 | Bauch et al. | 398/188 |
| 6,834,085 B1 * | 12/2004 | Leonowich et al. | 375/316 |
| 6,937,558 B2 * | 8/2005 | Wakutsu | 370/208 |
| 7,133,467 B2 * | 11/2006 | Nishio et al. | 375/316 |
| 7,136,430 B2 * | 11/2006 | Morris et al. | 375/316 |
| 7,483,506 B2 * | 1/2009 | Yajima et al. | 375/365 |
| 7,917,032 B2 * | 3/2011 | Mori | 398/72 |
| 7,983,308 B1 * | 7/2011 | Johnston et al. | 370/514 |
| 2009/0310712 A1 * | 12/2009 | Nakatani | 375/316 |

FOREIGN PATENT DOCUMENTS

| | | |
|---|---|---|
| JP | 9-36828 | 2/1997 |
| JP | 9-266497 | 10/1997 |
| JP | 2000-49823 | 2/2000 |
| JP | 2000-165368 | 6/2000 |
| JP | 2000-188593 | 7/2000 |
| JP | 2005-33537 | 2/2005 |

* cited by examiner

COMMUNICATION TERMINAL APPARATUS, COMMUNICATION APPARATUS, AND SIGNAL RECEIVING METHOD

CROSS-REFERENCE TO RELATED APPLICATION

This application is a continuation of PCT international application Ser. No. PCT/JP2007/56268 filed on Mar. 26, 2007 which designates the United States, the entire contents of which are incorporated herein by reference.

FIELD

The embodiment(s) discussed herein is (are) directed to a communication terminal apparatus connected to a network that contains a plurality of bit rates, a communication apparatus and a signal receiving method thereof.

BACKGROUND

To respond to an increase in data traffic typically found in the Internet, construction of high-speed and large-capacity optical access networks rapidly progresses. Recently, a gigabit-passive optical network (G-PON) in which a plurality of subscribers share an optical fiber cable while high-speed upstream transmission of 1.25 Gbps and downstream transmission of 2.4 Gbps at the maximum is available is widely used as a high-speed optical access system for constructing an optical access network.

To achieve still higher speed transmission in the future, development of a bit-rate mixed PON system in which an optical access network that has already been constructed is utilized and at the same time high-speed transmission (for example, 10 Gbps) is available only to the subscribers who require high-speed transmission is expected from the economical point of view. For example, Japanese Laid-open Patent Publication No. 08-008954 discloses a technology that implements a bit-rate mixed PON system. According to the technology, a multi-rate burst circuit is provided to an optical network unit (ONU) for each subscriber. Thus, a plurality of bit rates can be mixed in the PON system.

If an existing optical access network is utilized so that the optical access network contains a plurality of bit rates, a subscriber that uses a high-speed bit rate encounters receiver sensitivity degradation. The faster a network is, i.e., the broader a band is, the lower a signal/noise (S/N) ratio becomes. Therefore, by speeding up part of an existing optical access network that has been designed such that the network has a relatively low receiver sensitivity without expecting higher speed data transmission, the S/N ratio drops due to the widening of the band, which degrades the receiver sensitivity.

For example, if part of an optical access network that has been designed to run at 2.4 Gbps is speeded up to 10 Gbps, receiver sensitivity of a communication terminal apparatus for a subscriber using the speed-up transmission drops, for example, by about 4 dB. As a result, expected high transmission speed may not be achieved.

Similarly, in a network formed from an existing optical access network so that higher speed communication is available for some of the subscribers of the network, receiver sensitivity degradation occurs also in an optical line terminal (OLT) that functions as a line concentrator located on the station side. In other words, if the OLT is speeded up (broadbanded) to receive an upstream signal from a subscriber that uses higher speed communication, the S/N ratio deteriorates as the band is broadened. As a result, reception of an upstream signal from an existing ONU designed in relatively low receiver sensitivity becomes more difficult.

SUMMARY

According to an aspect of the invention, a communication terminal apparatus that receives a management signal transmitted at a bit rate A and a data signal transmitted at a bit rate B, where B=A×M, through a common line. The communication terminal apparatus includes: a signal regenerating unit that regenerates a signal transmitted through the line as a signal of a bit rate C, where C=A×N; a management signal converting unit that analyzes the signal regenerated by the signal regenerating unit and converts N bits of the signal into the management signal of one bit; a timing control unit that controls timing for obtaining a data signal destined for the communication terminal apparatus based on the management signal obtained by the management signal converting unit; and a data signal obtaining unit that obtains the data signal from the signal regenerated by the signal regenerating unit according to timing control of the timing control unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Preferred embodiments of the present invention will be explained with reference to accompanying drawings. Although a communication apparatus including a communication terminal apparatus is described below as an optical network unit (ONU) and an optical line terminal (OLT) in an optical access network, this is by way of example only. The following embodiments are also applicable to various other communication terminal apparatuses.

Figure 1:
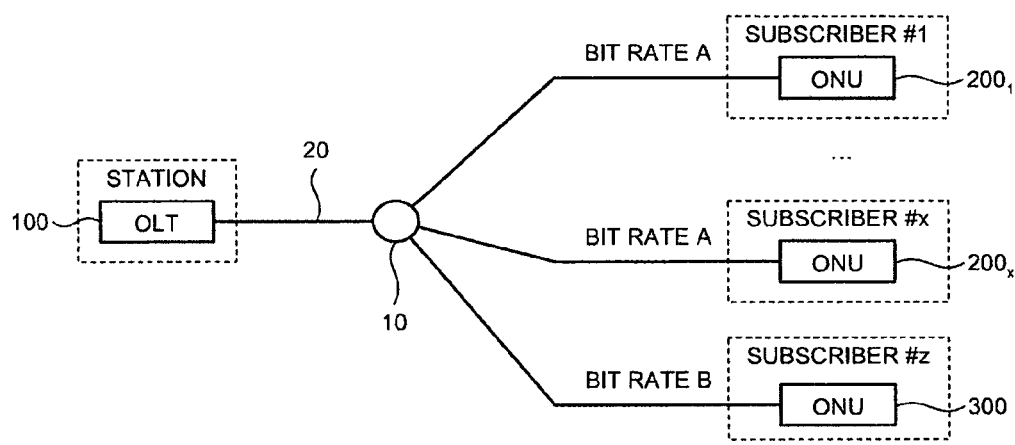
FIG. 1 is an example of an optical access network in which signals of a plurality of bit rates are transmitted.

An optical access network that contains a plurality of bit rates is described in detail below. FIG. 1 is a diagram of an example of an optical access network which operates at a plurality of bit rates. The optical access network illustrated in FIG. 1 is constructed in a PON system. In the optical access network, an optical fiber cable 20 connected to an optical line terminal (OLT) 100 provided in a station is split by a power splitter 10, and is shared by ONUs $200_1$ to $200_X$ and 300 on the side of subscribers.

The optical access network of the example contains the ONUs $200_1$ to $200_X$ that perform communication at a bit rate A and the ONU 300 that performs communication at a bit rate B, which is M times higher than the bit rate A. At first, the optical access network runs at the bit rate A, and later, an ONU for subscriber #z is replaced by the ONU 300 and an OLT at the station is replaced by the OLT 100. Thus, the optical access network can contain the both bit rates.

In the network, information exchange between the OLT 100, the ONUs $200_1$ to $200_X$ and 300 is controlled with a time division system. For example, a downstream communication from the station to the subscribers is controlled with a time division multiplexing (TDM) system, and the OLT 100 transmits data while switching a destination ONU every time slot.

Figure 2:
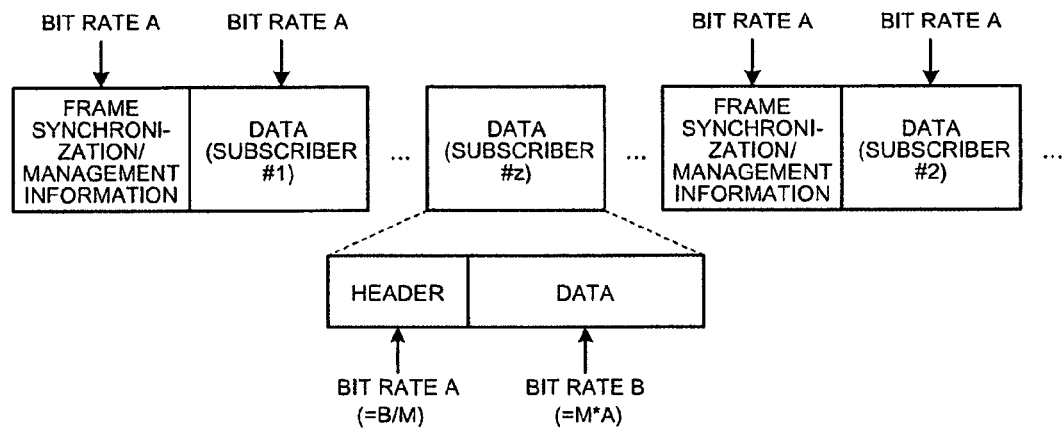
FIG. 2 is an example of a downstream signal.

FIG. 2 is a diagram of an example of a downstream signal. As illustrated in FIG. 2, the downstream signal is time division multiplexed, and transmitted so that data destined for a plurality of subscribers is mixed therein. The OLT 100 periodically generates frame synchronization/management information so that the ONUs $200_1$ to $200_X$ and 300 perform frame synchronization to acquire timing to obtain data destined for each ONU, and the frame synchronization/management information is also multiplexed as is the data and is contained in the downstream signal.

In downstream communication, the same signal is transmitted to the ONUs $200_1$ to $200_X$ and 300. Each of the ONUs $200_1$ to $200_X$ and 300 discards data destined for ONUs other than itself and processes only the frame synchronization/management information and the data destined thereto. Thus, a one-to-one connection is virtually established between the OLT 100 and the ONUs $200_1$ to $200_X$ and 300.

Focusing attention on bit rates, all the ONUs are required to read the frame synchronization/management information. Thus, the frame synchronization/management information is transmitted at the bit rate A. Time divided data is transmitted with a header, attached thereto, containing information of specifying a destination ONU. All the ONUs are required to read the header. Thus, the header is also transmitted at the bit rate A. Data itself is transmitted at a bit rate corresponding to the destination ONU.

Thus, the ONUs $200_1$ to $200_X$ receive all the signals at the bit rate A. On the other hand, the ONU 300 receives a management signal that transmits a header and frame synchronization/management information at the bit rate A and a data signal that transmits data itself at the bit rate B.

In an environment in which different bit rates are mixed, the data signal is transmitted at a bit rate corresponding to a destination ONU, and the management signal is always transmitted at the lower bit rate A. As described above, an ONU designed to communicate at a higher bit rate is affected by noise in a network designed to run at a lower bit rate, which degrades the receiver sensitivity. Especially, the degradation of receiver sensitivity can cause a problem at the time of receiving a management signal.

Only a destination ONU needs to read the data signal. Therefore, it is not necessary to consider effects to other existing ONUs. For example, by employing error correcting techniques such as forward error correction (FEC), degradation of receiver sensitivity can be compensated. On the other hand, all the ONUs are required to read a management signal. Therefore, a compensating approach that may affect the existing ONUs cannot be adapted.

To solve the receiver sensitivity degradation while a management signal is received in a network in which signals of a plurality of bit rates are transmitted without affecting the existing ONUs, according to the first embodiment, the ONU 300 employs a majority decision approach.

Figure 3:
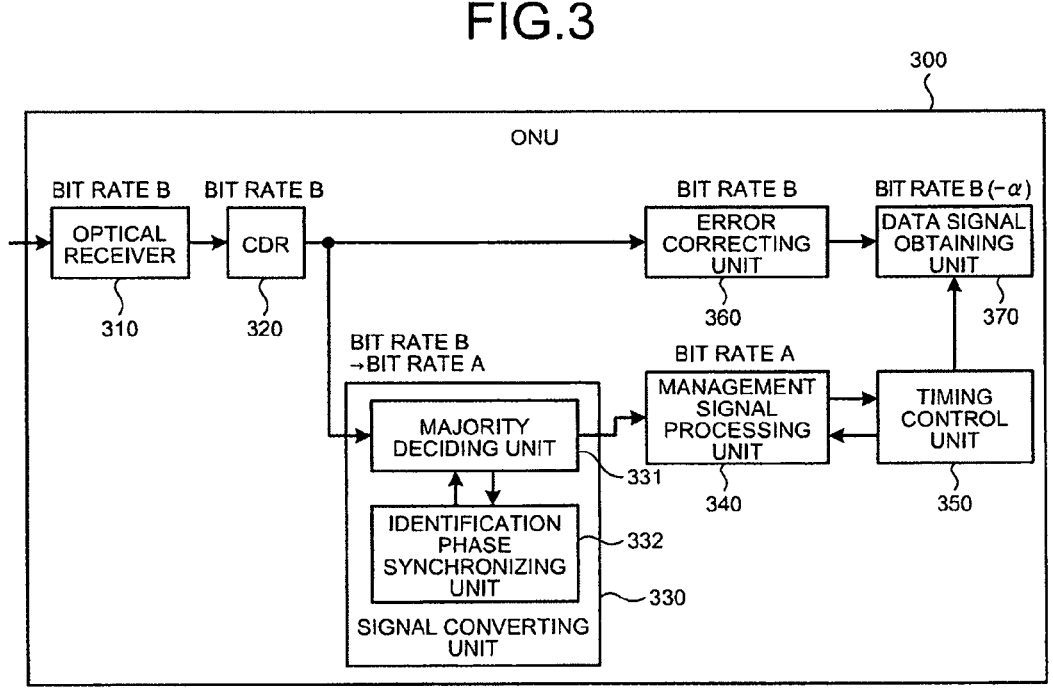
FIG. 3 is an example block diagram of an ONU according to a first embodiment.

The configuration of the ONU 300 is described in detail below. FIG. 3 is a block diagram of the ONU 300. For simplicity, FIG. 3 illustrates only the configuration related to this embodiment. For example, the configuration related to signal transmission is omitted.

As illustrated in FIG. 3, the ONU 300 includes the optical receiver 310, a signal regenerating unit (hereinafter, "clock data recovery (CDR)") 320, a signal converting unit 330, a management signal processing unit 340, a timing controlling unit 350, an error correcting unit 360, and a data signal obtaining unit 370.

The optical receiver 310 converts an optical signal received, for example, by a photodiode into an electrical signal. The CDR 320 generates, according to an electrical signal converted by the optical receiver 310, a clock signal according to which the ONU 300 operates, and regenerates a digital signal. The ONU 300 is a communication terminal apparatus that receives data at the bit rate B. Therefore, the CDR 320 regenerates a digital signal of the bit rate B.

The signal converting unit 330 and the error correcting unit 360 receive a digital signal regenerated by the CDR 320. The signal converting unit 330 is a processing unit that converts a digital signal of the bit rate B regenerated by the CDR 320 into a digital signal of the bit rate A so that a management signal can be read out. The signal converting unit 330 includes a majority deciding unit 331 and an identification phase synchronizing unit 332.

Figure 4:
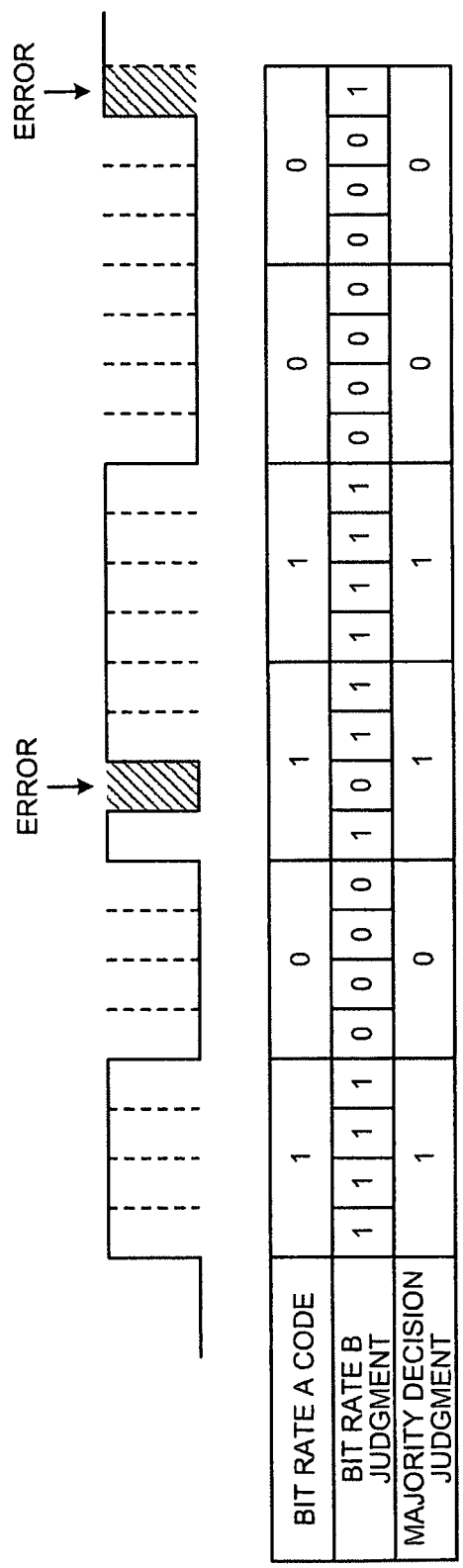
FIG. 4 is an example schematic diagram for explaining the operation of a majority deciding unit when a bit rate B is a quadruple of a bit rate A.

The majority deciding unit 331 converts an M-bit signal into one-bit management signal while performing error correction by using majority decision logic. FIG. 4 illustrates an example of the operation of the majority deciding unit 331. In the example, the bit rate B is a quadruple of the bit rate A, and a four-bit management signal is converted into a one-bit management signal.

A digital signal regenerated by the CDR 320 is supposed to be represented by 4 bits having the same value, like "0000" or "1111", and be able to be simply converted to "0" or "1". However, an error may occur in some bits, like "1011" or "0001", due to influence from noise caused by speeding up.

The majority deciding unit 331 converts "1011" into "1" and "0001" into "0" by using majority decision logic. Thus, by using majority decision logic, an error rate of a management signal can be significantly reduced, comparing with a case in which a value of a management signal is determined according only to a bit in a specific location.

For example, if majority decision is performed on four values as in the example of FIG. 4, one bit of error correction is possible. In a received signal having an error rate of E (for example, $1\times10^{-6}$), a probability that error occurs repeatedly is approximately $E^2$ (for example, $1\times10^{-12}$). Therefore, receiver sensitivity characteristics can be improved, for example, by four to five dB.

If simple majority decision logic is employed, majority decision becomes logically indefinite when there are two identical values in a signal (for example, two bits and two bits in four bits). Even in such a case, majority decision can be performed by assigning a weight to a bit with less intersymbol interference caused by the bits therebefore and thereafter, that is, a bit with less probability of errors (for example, the third bit in the four bits). Then, the correct decision result can be obtained at a high probability.

Figure 5:
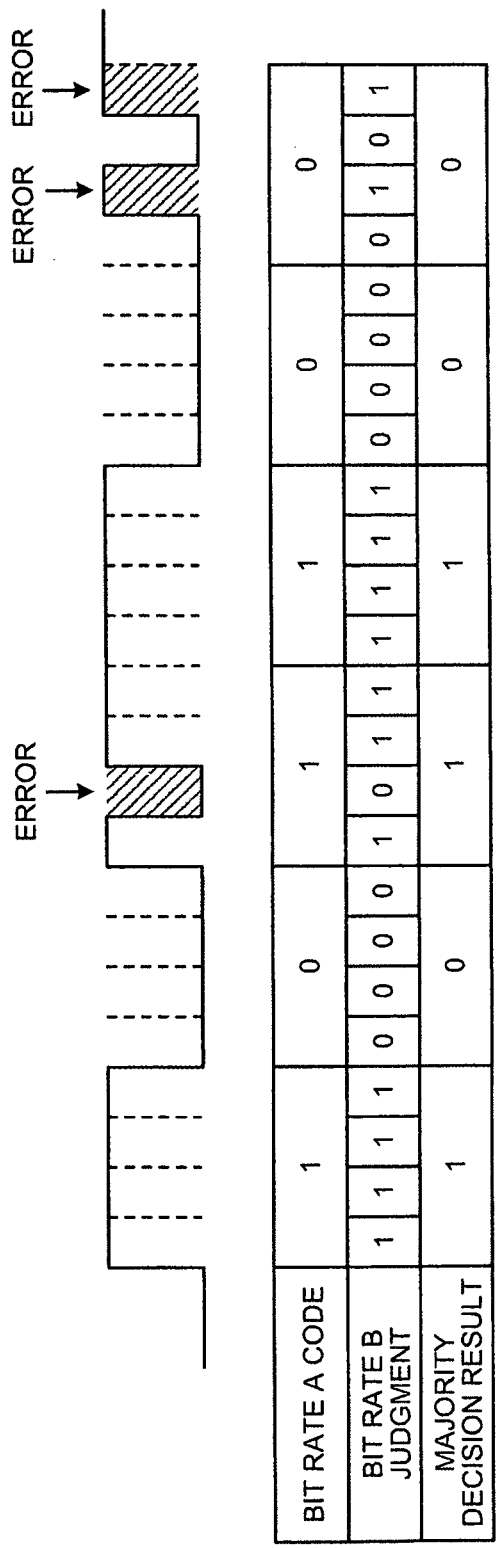
FIG. 5 is an example schematic diagram for explaining the operation of the majority deciding unit when a weight is assigned to the third bit at the time of majority decision.

FIG. 5 illustrates an example of the operation of the majority deciding unit 331 when a weight is assigned to a certain bit. If majority decision is performed on four values as in the example of FIG. 5, an error is likely to occur at the first or the fourth bit due to intersymbol interference. Thus, by assigning a weight to a bit near the center of a signal (in the example of FIG. 5, the third bit in the four bits), precision of error correction based on majority decision can be improved and an event where majority decision becomes logically indefinite because the numbers of "0" and "1" are the same can be avoided.

In the example of FIG. 5, a weight is assigned to the third bit. Therefore, majority decision result of "0" can be obtained even if an error occurs at the second bit and the numbers of 0 and 1 become the same in number as in "0101".

Referring back to FIG. 3, the identification phase synchronizing unit 332 first identifies a phase (bit) that is a beginning point of a management signal for the majority deciding unit 331 to start converting every M bits of signal regenerated by the CDR 320 into one bit of management signal and then notifies the majority deciding unit 331 about the identification result.

The management signal processing unit 340 recognizes, by reading a management signal of a bit rate A converted by the signal converting unit 330, frame synchronization/management signal and the header thereof and performs various control processes accordingly. For example, the management signal processing unit 340 performs frame synchronization and obtains timing for altering time slots by recognizing frame synchronization signal consisting of known signal patterns.

The management signal processing unit 340 determines at which time slot data is transmitted to the particular destination ONU in accordance with information contained in the frame synchronization/management information and the header, and notifies the timing controlling unit 350 of the result of the determination.

The timing control unit 350 instructs the data signal obtaining unit 370 to start and terminate obtaining data destined for the particular ONU according to the information notified by the management signal processing unit 340.

The error correcting unit 360 corrects errors in a data signal transmitted to the particular ONU, thereby enhancing receiver sensitivity of a data portion. Error correction of the data signal can be performed, for example, by employing FEC. In error correction performed by error correcting techniques such as FEC, data is made redundant at a transmission source. Thus, a bit rate of the data signal after the error correction by the error correcting unit 360 slightly drops by the amount of data made redundant.

The error correcting unit 360 corrects signals that constitute management signals and data destined for other ONUs. However, these signals are discarded by the data signal obtaining unit 370, and cause no problem.

The data signal obtaining unit 370 abstracts data destined for the particular ONU by obtaining a data signal corrected by the error correcting unit 360 with timing specified by the timing controlling unit 350. The data signal obtaining unit 370 provides the obtained data to an appropriate processing unit (not illustrated) and the processing unit performs required data processing.

As described above, according to the first embodiment, the ONU 300 improves, by applying an error correction code such as forward error correction (FEC), receiver sensitivity of a data signal that can be modified, and improves, by applying majority decision, receiver sensitivity of a management signal that cannot be modified.

Figure 6:
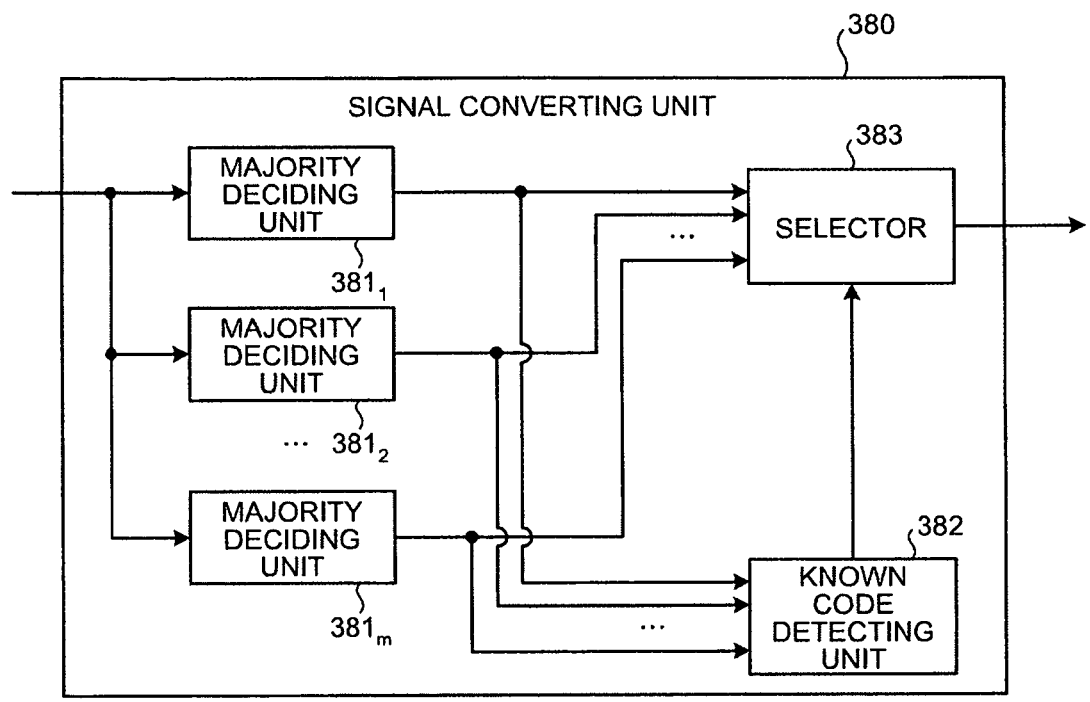
FIG. 6 is an example block diagram of a signal converting unit.

FIG. 6 illustrates a specific example of a signal converting unit 380. The signal converting unit 380 illustrated in FIG. 6 implements frame synchronization which is part of the functions of the management signal processing unit 340 in FIG. 3 in addition to the functions of the signal converting unit 330 in FIG. 3. The signal converting unit 380 includes majority deciding units $381_1$ to $381_m$, a known code detecting unit 382, and a selector 383.

The majority deciding units $381_1$ to $381_m$ are circuits disposed M pieces in number, each of which performs majority decision on every M bits of digital signal regenerated by the CDR 320 and then converts the M bits into one bit of management signal. To start majority decision, the majority deciding units $381_1$ to $381_m$ are controlled so that a bit regarded as a beginning point of a management signal is shifted by one bit each. For example, if the majority deciding unit $381_1$ starts majority decision by regarding the first bit as a beginning point of a management signal, the majority deciding unit $381_2$ starts majority decision by regarding the second bit as a beginning point of the management signal, and the majority deciding unit $381_m$ starts majority decision by regarding the Mth bit as a beginning point of the management signal.

The known code detecting unit 382 stores therein each of a predetermined bit length of a sequence of a management signal converted by each of the majority deciding units $381_1$ to $381_m$ and compares each with a known signal pattern that represents a frame synchronization signal. The known code detecting unit 382 notifies the selector 383 about the number of a majority deciding unit whose converted sequence of the management signal matches the known signal pattern at the smallest error rate (or at the highest majority decision matching).

The selector 383 sends out to the management signal processing unit 340, which performs a succeeding processing after the selector 383, an output from the majority deciding unit corresponding to the number notified by the known code detecting unit 382, as a management signal. Thus, the signal converting unit 380 is configured to perform identification phase synchronization and frame synchronization simultaneously. Therefore, time required for the ONU to start receiving data after the power is turned on can be reduced.

Figure 7:
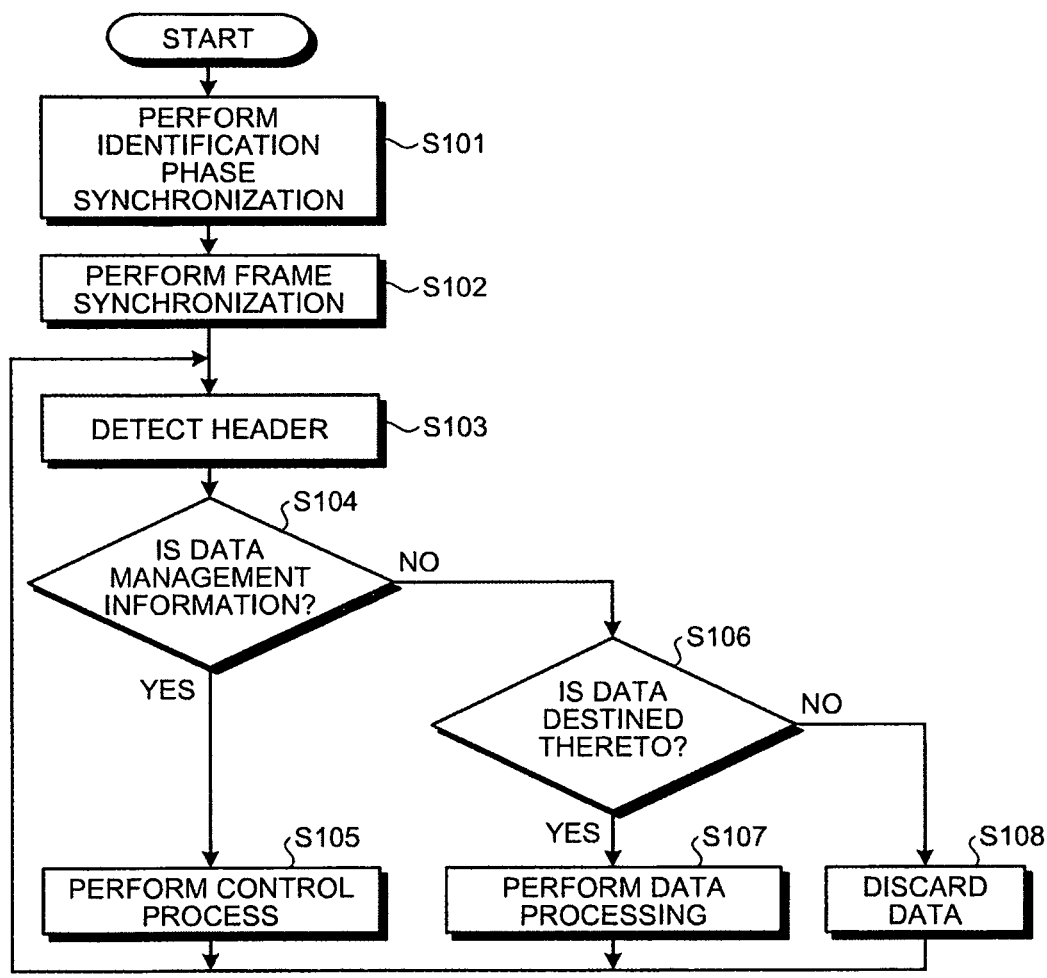
FIG. 7 is an example flowchart of the operation of an ONU.

The operation of the ONU 300 illustrated in FIG. 3 is described in detail below. FIG. 7 is a flowchart of the operation of the ONU 300. As illustrated in FIG. 7, after the ONU is turned on, the identification phase synchronizing unit 332 performs identification phase synchronization for a signal regenerated by the CDR 320 so that the majority deciding unit 331 can normally convert a management signal (Step S101).

Then, the management signal processing unit 340 performs frame synchronization, and frame synchronization/management information and a header can be recognized normally (Step S102). Thus, the initial process is completed, and the management signal processing unit 340 performs the following process every time a signal corresponding to one time slot is received.

The management signal processing unit 340 detects a header of the signal corresponding to one time slot thus obtained (Step S103). If the signal corresponding to one time slot thus obtained is determined to be the frame synchronization/management information (Yes at Step S104), the management signal processing unit 340 performs a control process according to the content of the frame synchronization/management information (Step S105).

If the data corresponding to one time slot thus obtained is not the frame synchronization/management information and is determined to be data destined for the ONU 500 (No at Step S104 and Yes at Step S106), the management signal processing unit 340 notifies the timing controlling unit 350 of information for obtaining the data and the data signal obtaining unit 370 obtains the data (Step S107).

If the obtained signal corresponding to one time slot is determined to be neither frame synchronization/management signal nor data destined for a particular ONU (NO at Step S104 and NO at Step S106), the management signal processing unit 340 does not notify the timing control unit 350 about information for obtaining the data but discards the information (S108).

As described above, according to the first embodiment, a management signal is first regenerated at the same bit rate as a data signal, and then converted into the original management signal while performing error correction by using majority decision. Therefore, an error rate of a management signal can be reduced and receiver sensitivity thereof can be improved.

In the first embodiment, an example is described in which a signal is first regenerated by a CDR at the same bit rate as a data signal and then majority decision is performed, thereby improving receiver sensitivity of a management signal. In a second embodiment, an example is described in detail in which a signal is first regenerated by a CDR at a bit rate higher than a bit rate of a data signal and then majority decision is performed, thereby improving receiver sensitivity.

Figure 8:
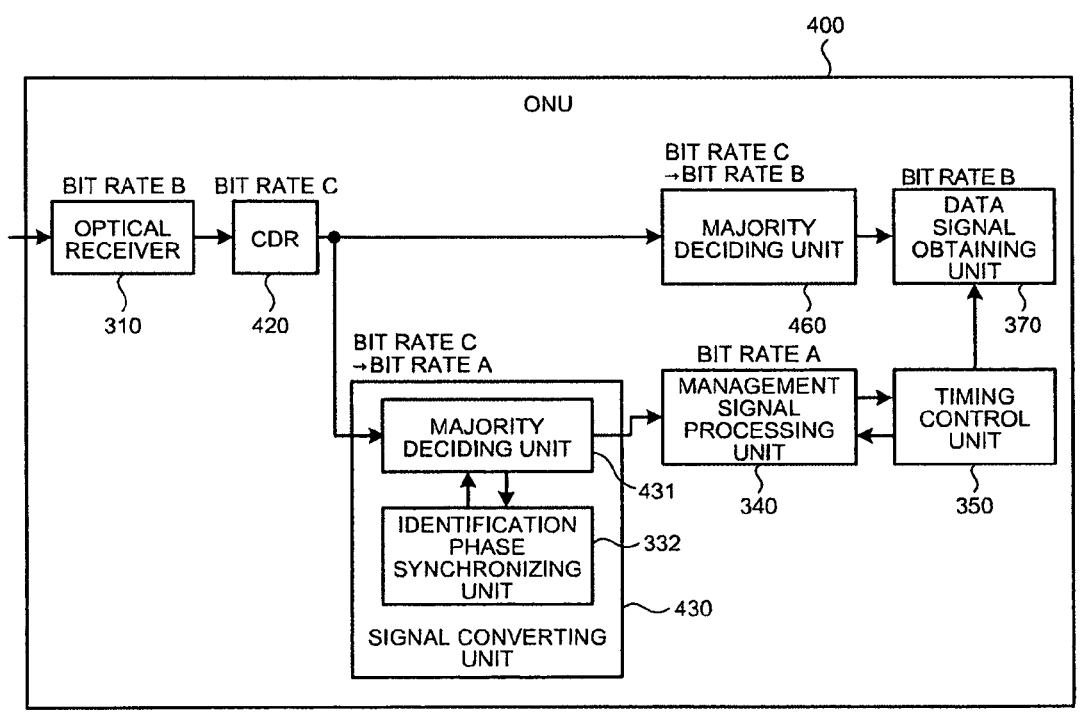
FIG. 8 is an example block diagram of an ONU according to a second embodiment.

FIG. 8 is a block diagram of an ONU 400 according to the second embodiment. Similar to the ONU 300, the ONU 400 communicates at the bit rate B in a network in which signals of the bit rate A and the bit rate B (where the bit rate B is M times faster than the bit rate A). The ONU 400 includes the optical receiver 310, a CDR 420, a signal converting unit 430, the management signal processing unit 340, the timing control unit 350, a majority deciding unit 460, and the data signal obtaining unit 370.

The optical receiver 310, the management signal processing unit 340, the timing control unit 350, and the data signal obtaining unit 370 are similar to those of in FIG. 3. Therefore, their description is not repeated below. The CDR 420 is a processing unit that generates, according to an electrical signal converted by the optical receiver 310, a clock signal to operate the ONU 400 and regenerates a digital signal. The CDR 420 regenerates a signal into a digital signal of a bit rate C that is N times faster than the bit rate A (where N is an integer multiple of M).

The signal converting unit 430 and the majority deciding unit 460 receive a digital signal regenerated by the CDR 420. The signal converting unit 430 converts a digital signal of the bit rate C that is regenerated by the CDR 420 into a digital signal of the bit rate A so that a management signal can be read out. The signal converting unit 430 includes a majority deciding unit 431 and the identification phase synchronizing unit 332. The identification phase synchronizing unit 332 is similar to that of FIG. 3. Therefore the descriptions thereof are omitted here.

The majority deciding unit 431 converts N bits of signal into one bit of management signal while performing error correction by using majority decision logic. In the majority decision, as in the first embodiment, simple majority decision may be used, or majority decision assigning a weight to a particular bit may be used.

The majority deciding unit 460 first converts a digital signal of the bit rate C regenerated by the CDR 420 into a digital signal of the bit rate B so that a data signal can be read out and then sends out the conversion result to the data signal obtaining unit 370. More specifically, the majority deciding unit 460 converts N/M bits of signal into one bit of data signal while performing error correction by using majority decision logic.

In majority decision, simple majority decision may be used or majority decision assigning a weight to a particular bit may be used. In error correction by majority decision, data is not made redundant as in error correction by FEC and the like. Therefore, the data signal obtaining unit 370 can receive a signal at the bit rate B without any change in the speed.

As described above, according to the second embodiment, the CDR 420 regenerates a signal at a bit rate higher than a bit rate of a data signal. Therefore, an error rate of not only a management signal but also a data signal can be reduced because of majority decision, and receiver sensitivity of not only a management signal but also a data signal can be improved.

The configuration of the ONU 300 in FIG. 1 can be regarded as a modification of the ONU 400 configured so that N is equal to M and the error correcting unit 360 performs error correction of a data signal in place of the majority deciding unit 460.

In a third embodiment, an example is described in detail in which an error rate of an ONU that communicates at a higher bit rate is further reduced by removing influence of intersymbol interference in an optical access network in which signals of a plurality of bit rates are transmitted.

Figure 9:
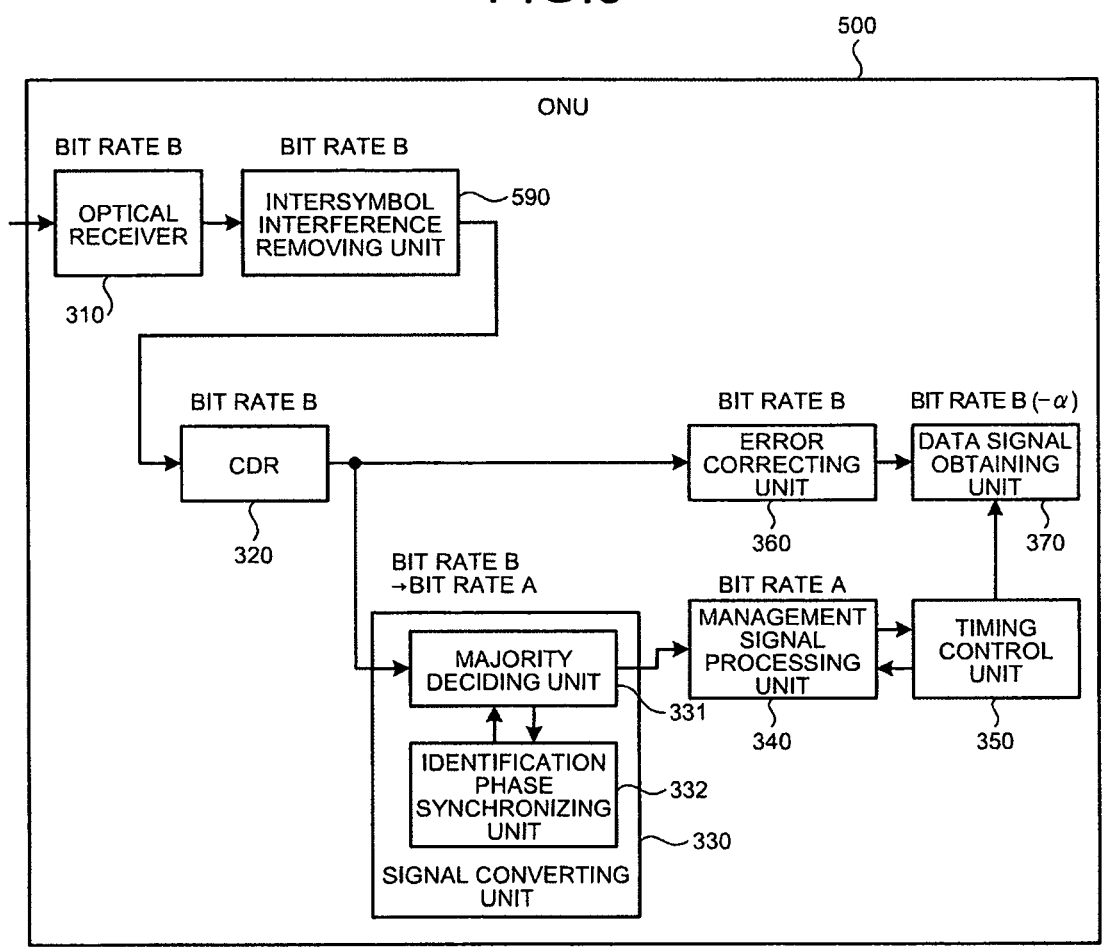
FIG. 9 is an example block diagram of an ONU according to a third embodiment.

FIG. 9 is a block diagram of an ONU 500 according the third embodiment. Similar to the ONU 300, the ONU 500 communicates at the bit rate B in an optical access network in which signals of the bit rates A and B are transmitted (where the bit rate B is M times faster than the bit rate A). The ONU 500 includes the optical receiver 310, an intersymbol interference removing unit 590, the CDR 320, the signal converting unit 330, the management signal processing unit 340, the timing control unit 350, the error correcting unit 360, and the data signal obtaining unit 370.

Figure 10:
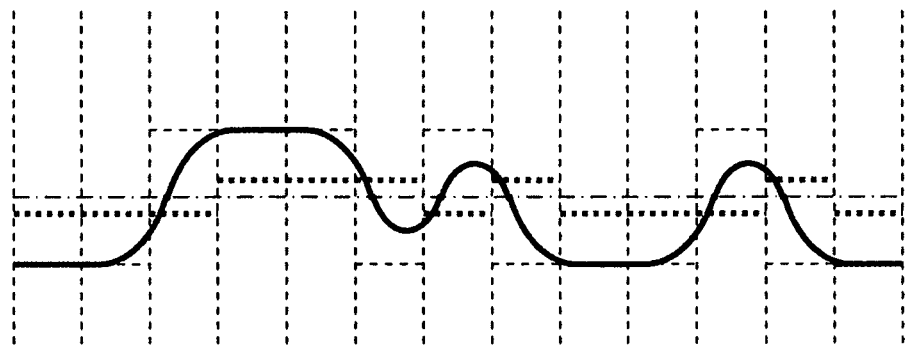
FIG. 10 is an example schematic diagram for explaining removal of an intersymbol interference performed by an intersymbol interference removing unit.

Comparing the ONU 500 with the ONU 300 in FIG. 3, the ONU 500 is configured similarly to the ONU 300 except that the ONU 500 has the intersymbol interference removing unit 590 provided between the optical receiver 310 and the CDR 320. FIG. 10 is a diagram for illustrating the principle of removing intersymbol interference performed by the intersymbol interference removing unit 590. As illustrated in FIG. 10, after a signal corresponding to "1" is received, a decision level of 0/1 is increased, and after a signal corresponding to "0" is received, the decision level of 0/1 decreases, thereby eliminating occurrence of an error due to intersymbol interference.

Figure 11:
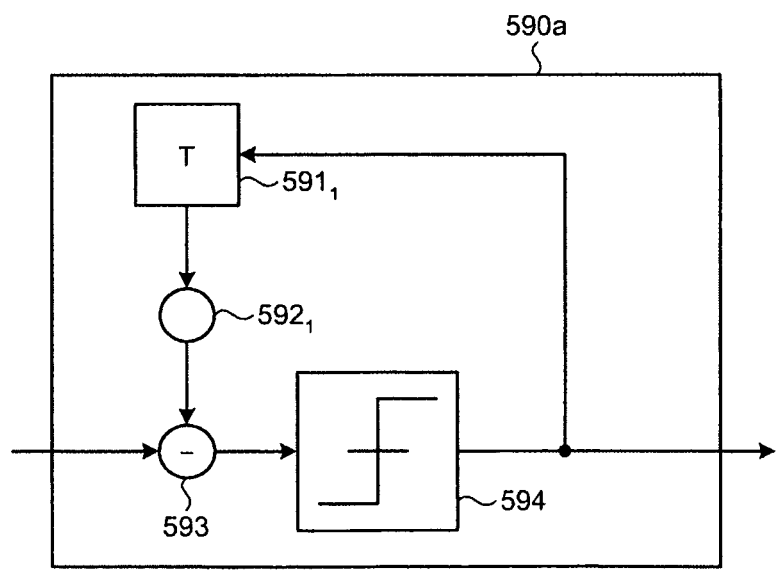
FIG. 11 is an example block diagram of a decision feedback equalizer that removes an intersymbol interference based on one bit of signal just received.

The function performed by the intersymbol interference removing unit 590 can be implemented by, for example, using a decision feedback equalizer 590a illustrated in FIG. 11. A delay circuit 591$_1$ is a circuit that stores therein the previous decision result from an identifier 594 that performs decision of 0/1. An integrator 592$_1$ is a circuit that multiplies a value stored by the delay circuit 591$_1$ by a predetermined coefficient. A subtractor 593 is a circuit that shifts a signal to the direction of 0 by the calculation result from the delay circuit 591$_1$, thereby causing substantially the same effect as if a decision level of 0/1 is increased.

Figure 12:
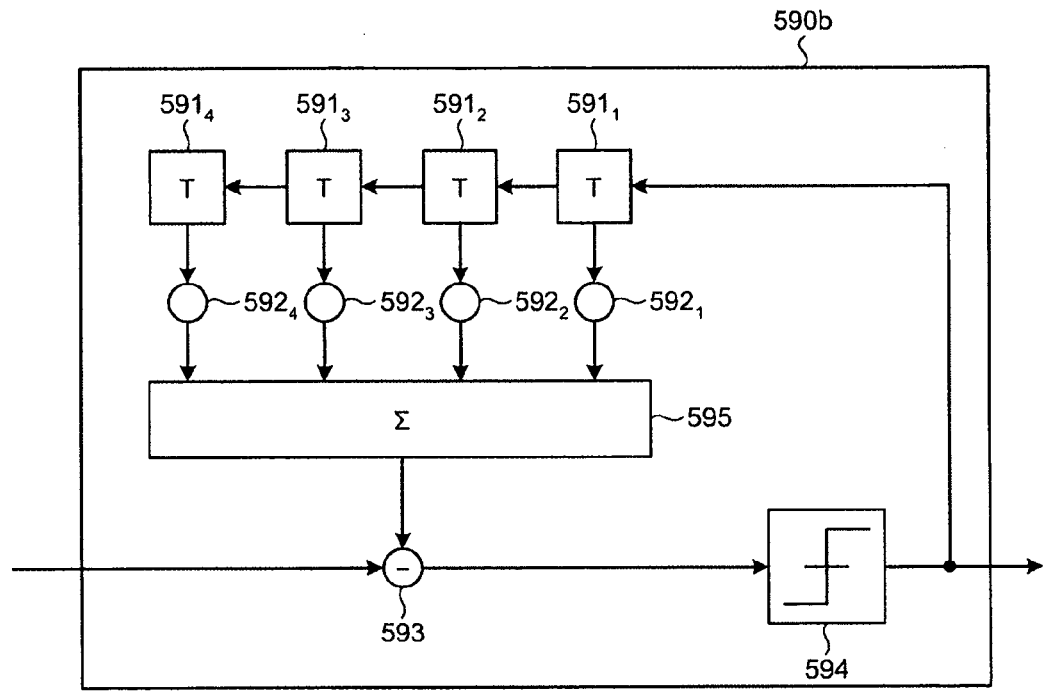
FIG. 12 is an example block diagram of a decision feedback equalizer that removes an intersymbol interference based on four bits of signal just received.

The configuration illustrated in FIG. 11 is an example that intersymbol interference is removed based on one bit of signal just received. However, intersymbol interference may be removed based on a plurality of bits of signal just received. FIG. 12 is a block diagram of a decision feedback equalizer 590b that removes intersymbol interference based on four bits of signal just received. As illustrated in FIG. 12, the decision feedback equalizer 590b includes delay circuits 591$_1$ to 591$_4$ each of which stores therein the last four bits of the decision result from the identifier 594, integrators 592$_1$ to 592$_4$ that multiply each of the values stored by each of the delay circuits by a predetermined coefficient, and an accumulator 595 that first adds all the calculation results from the integrators 592$_1$ to 592$_4$ and then outputs the result to the subtractor 593.

As described above, according to the third embodiment, intersymbol interference is removed from a signal preceding regeneration by the CDR 320. Therefore, error rates of a management signal and a data signal can be reduced and the receiver sensitivity can be improved.

In the third embodiment, an example is described in which an error rate is reduced in an ONU that communicates at a high bit rate in an optical access network in which signals of a plurality of bit rates are transmitted. In the fourth embodiment, an error rate in an ONU that communicates at a lower bit rate can also be reduced.

Figure 13:
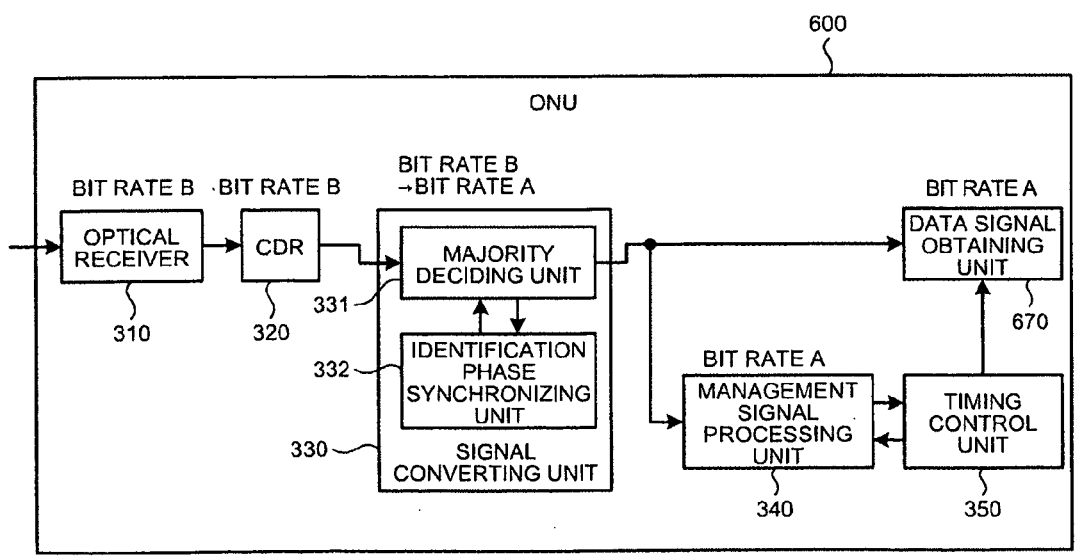
FIG. 13 is an example block diagram of an ONU according to a fourth embodiment.

FIG. 13 is a block diagram of an ONU 600 according to a fourth embodiment. The ONU 600 is an ONU that communicates at the bit rate A in an optical access network in which signals of the bit rates A and B are transmitted (where the bit rate B is M times faster than the bit rate A). The ONU 600 includes the optical receiver 310, the CDR320, the signal converting unit 330, the management signal processing unit 340, the timing control unit 350, and a data signal obtaining unit 670.

Comparing the ONU 600 with the ONU 300 in FIG. 3, the ONU 600 has the data signal obtaining unit 670 that receives a data signal at the bit rate A provided in place of the data signal obtaining unit 370 that receives a data signal at the bit rate B (−α). The majority deciding unit 331 performs error correction of not only a management signal but also a data signal. Therefore, the ONU 600 is configured so that the error correcting unit 360 is not provided and the data signal obtaining unit 670 receives a data signal from the majority deciding unit 331.

As described above, according to the fourth embodiment, a management signal and a data signal are regenerated at bit rate higher than the original bit rate, and converted into the original bit rate while error correction is performed by majority decision. Therefore, an error rate can be reduced also in an ONU that communicates at a lower bit rate.

Figure 14:
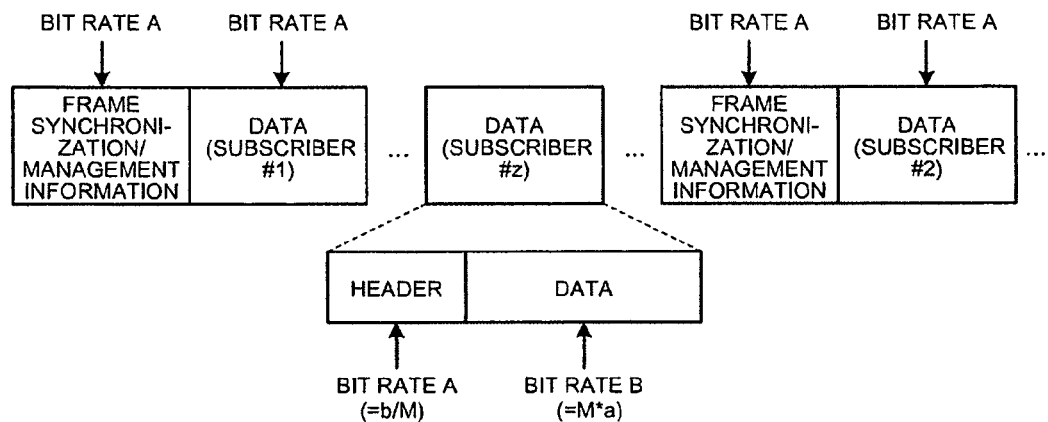
FIG. 14 is an example of a downstream signal in which a bit rate B is not an integer multiple of a bit rate A.

In all the above embodiments, it is assumed that the speeded up bit rate of B is an integer multiple of the bit rate A. In a fifth embodiment, an approach is described in detail that can be applied to a case in which the bit rate B is not an integer multiple of the bit rate A as in the example of FIG. 14. In the example of FIG. 14, the bit rate B is not an integer multiple of the bit rate A. Therefore, by performing majority decision on M bits of signal of a bit rate b, a management signal of the bit rate A can be obtained. By performing majority decision on M bits of signal of the bit rate B, however, a management signal of the bit rate A cannot be obtained.

Figure 15:
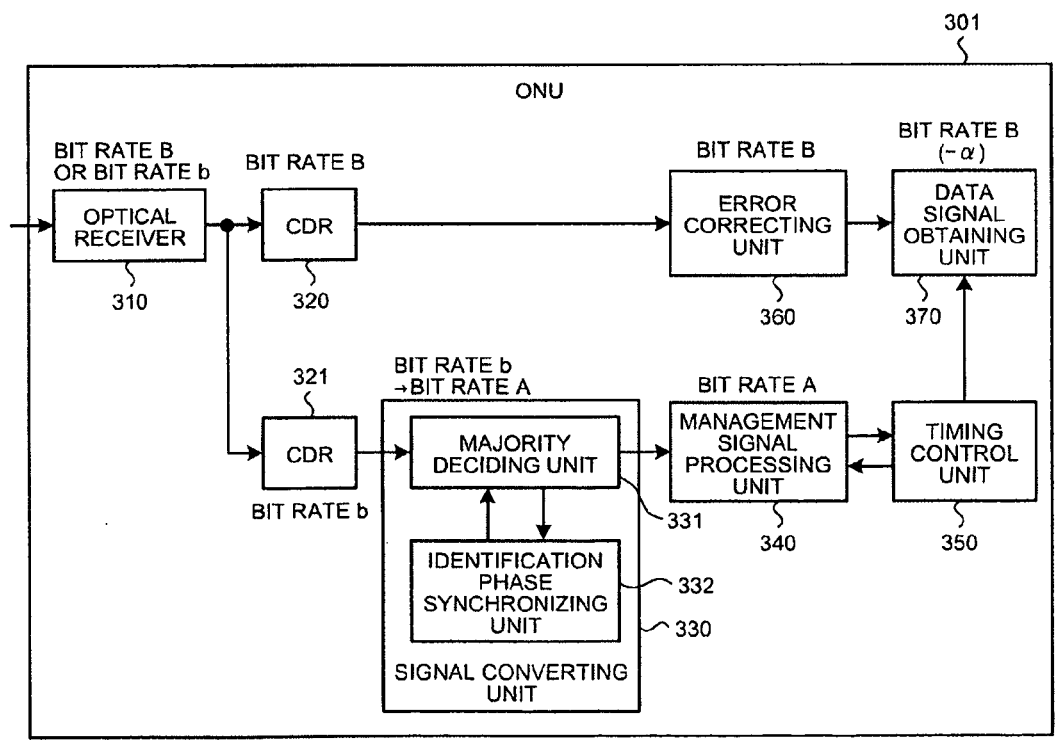
FIG. 15 is an example block diagram of an ONU according to a fifth embodiment.

FIG. 15 is a block diagram of an ONU 301 according to the fifth embodiment. The ONU 301 is a modification of the ONU 300 in the first embodiment so that the ONU 301 can be used when the bit rate B is not an integer multiple of the bit rate A, and further includes an CDR 321. The CDR 321 generates, according to an electrical signal converted by the optical receiver 310, a clock signal to operate the ONU 301 and regenerates a digital signal.

The CDR 320 first regenerates a signal in synchronization with the bit rate B according to a signal output by the optical receiver 310 and then outputs the signal to the error correcting unit 360. On the other hand, the CDR 321 regenerates a signal in synchronization with the bit rate b according to a signal output by the optical receiver 310 and then outputs the signal to the majority deciding unit 331. Therefore, the majority deciding unit 331 can perform majority decision on M bits of input signal and generate a management signal of the bit rate A. By using a CDR capable of synchronizing with both a signal of the bit rate B and a signal of the bit rate b, the CDR 320 and the CDR 321 can be alternated.

As described above, according to the fifth embodiment, the CDR 321 that generates a signal of the bit rate b is provided in addition to the CDR 320 that generates a data signal of the bit rate B (where b is M multiple of A). Therefore, a management signal having a lower error rate can be obtained by using majority decision even if the bit rate B is not an integer multiple of the bit rate A.

The fifth embodiment describes a modification example of the ONU 300 of the first embodiment. This modification can also be applied to the ONU in the other embodiments when the bit rate B is not an integer multiple of the bit rate A.

In a sixth embodiment, configuration and the like are described in detail of an OLT in an optical access network in which signals of a plurality of bit rates are transmitted. As described above, in an optical access network in which signals of a plurality of bit rates are transmitted, S/N ratio deteriorates due to broadband not only in the ONUs provided on the subscriber side but also in the OLT provided on the station side. Therefore, the normal reception of an upstream signal from the existing ONUs becomes more difficult.

Figure 16:
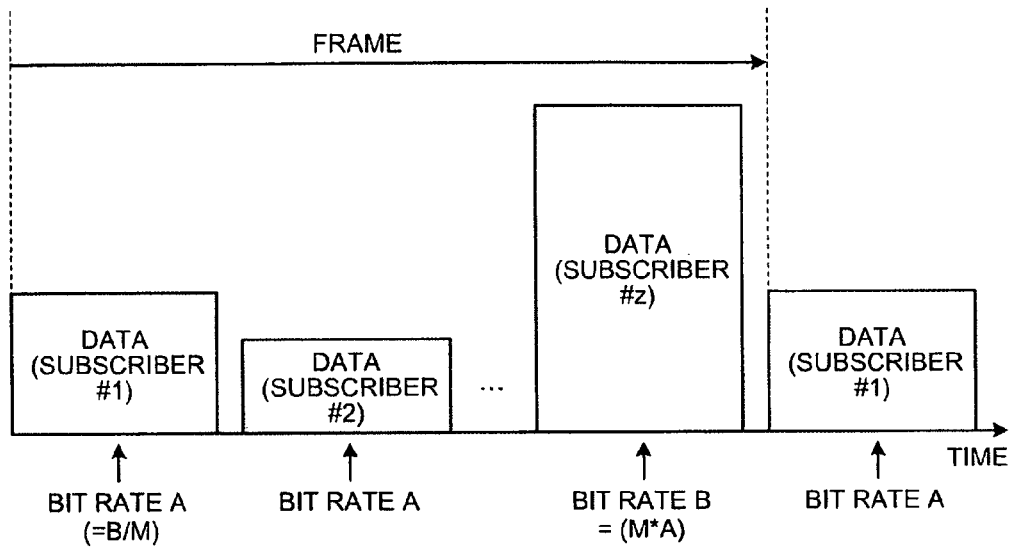
FIG. 16 is an example of an upstream signal.

An upstream signal received by the OLT is described in detail below. FIG. 16 is a diagram of an example of an upstream signal. As illustrated in FIG. 16, an upstream signal is time-division multiplexed and transmitted with data from a plurality of subscribers mixed therein. For example, upstream communication from a subscriber to the station side is controlled in time division multiple access (TDMA) system, and an OLT receives data while switching ONUs from which the data is transmitted for each time slot. In such a signal, due to the fluctuation of transmission loss for each subscriber, packets having different optical intensities are transmitted in burst. In an upstream signal, a management signal corresponding to frame synchronization/management information in a downstream signal is not transmitted and a data signal alone is transmitted.

Figure 17:
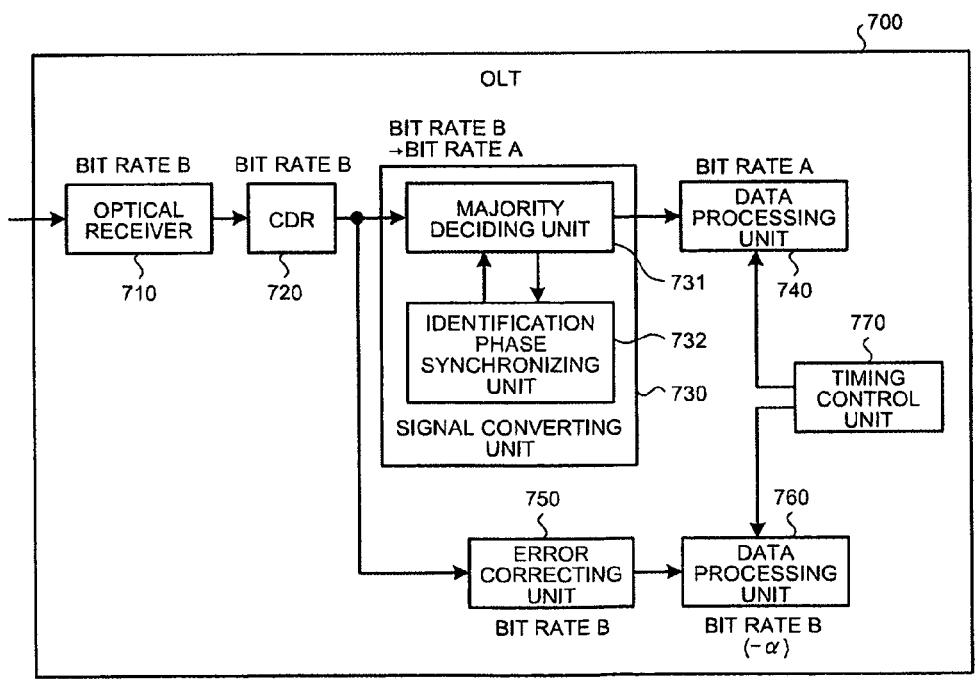
FIG. 17 is an example block diagram of an OLT according to a sixth embodiment.

An OLT 700 according to the sixth embodiment is described in detail below. FIG. 17 is a block diagram of the OLT 700 according to the sixth embodiment. For simplicity, FIG. 17 illustrates only constituent elements related to this embodiment. For example, the components related to signal transmission are omitted.

The OLT 700 is connected to an optical access network in which signals of the bit rates A and B are transmitted (where the bit rate B is M times faster than the bit rate A). The OLT 700 includes an optical receiver 710, a CDR 720, a signal converting unit 730, a data processing unit 740, an error correcting unit 750, a data processing unit 760, and a timing control unit 770.

The optical receiver 710 converts an optical signal received by a photodiode and the like into an electrical signal. The CDR 720 generates, according to the electrical signal converted by the optical receiver 710, a clock signal to operate the OLT 700 and regenerates a digital signal. The OLT 700 is a communication apparatus that supports data reception at the bit rate B. The CDR 720 regenerates a digital signal of the bit rate B.

The signal converting unit 730 and the error correcting unit 750 receive a digital signal regenerated by the CDR 720. The signal converting unit 730 converts a digital signal of the bit rate B regenerated by the CDR 720 into a digital signal of the bit rate A to obtain a data signal from an ONU that transmitted the signal at the bit rate A. The signal converting unit 730 includes a majority deciding unit 731 and an identification phase synchronizing unit 732.

The majority deciding unit 731 converts M bits of signal into one bit of signal while performing error correction by using majority decision logic. Thus, by converting a signal of the bit rate B into a signal of the bit rate A while performing error correction by using majority decision logic, deterioration of receiver sensitivity characteristics due to broadband can be improved.

Majority decision by the majority deciding unit 731 may also depend on simple comparison of the numbers of 0 and 1 or may also be performed by assigning a weight on a bit having less intersymbol interference (for example, the third bit in four bits).

When the majority deciding unit 731 converts every M bits of signal regenerated by the CDR 720 into one bit of signal, the identification phase synchronizing unit 732 identifies a bit (phase) at the beginning point of the conversion by the majority deciding unit 731, and then notifies the majority deciding unit 731 about the identification result.

The data processing unit 740 first obtains, based on timing specified by the timing control unit 770, a data signal whose bit rate is converted into the bit rate A by the signal converting unit 730 and then performs a predetermined data processing. The data processing unit 740 transfers the data signal thus processed to another device if it is required.

The error correcting unit 750 corrects an error that occurs in a data signal of the bit rate B, thereby improving receiver sensitivity of the data signal of the bit rate B. Error correction of a data signal can be performed by, for example, using FEC. In error correction by FEC and the like, data is made redundant by the transmission source of the data. Therefore, a bit rate of the data signal after error correction performed by the error correcting unit 750 is slightly lowered according to the amount of the data made redundant.

The data processing unit 760 first obtains, based on timing specified by the timing control unit 770, a data signal of the bit rate B whose error is corrected by the error correcting unit 750 and then performs a predetermined data processing. The data processing unit 760 transfers the data thus processed to another device if it is required.

The timing control unit 770 specifies, according to the known timing to receive a data signal from each ONU, a timing for obtaining a data signal corresponding to each ONU to the data processing unit 740 and the data processing unit 760.

As described above, according to the sixth embodiment, error correction is performed by majority decision for a data signal of a low bit-rate, and by using an error correction code for a data signal of a high bit-rate. Therefore, receiver sensitivity of an OLT in an optical network in which signals of a plurality of bit rates are transmitted can be improved. In the above embodiments, an optical access network is described in detail in which signals of two different bit rates are transmitted. Needless to say, however, the embodiments are similarly applicable also to an optical network in which signals of three or more different bit rates are transmitted such as an optical access network in which, for example, a signal of a bit rate A' is contained in addition (where A' is equal to B divided by M').

In the sixth embodiment, an example is described in detail in which a signal is regenerated by a CDR at the same bit rate as a data signal of a higher bit rate and majority decision is performed on the regenerated signal, thereby improving receiver sensitivity of the signal of the lower bit rate. In a seventh embodiment, an example is described in detail in which a signal is regenerated by a CDR at a higher bit rate than a data signal of a higher bit rate and majority decision is performed on the regenerated signal, thereby improving receiver sensitivity of the data signal of the higher bit rate also.

Figure 18:
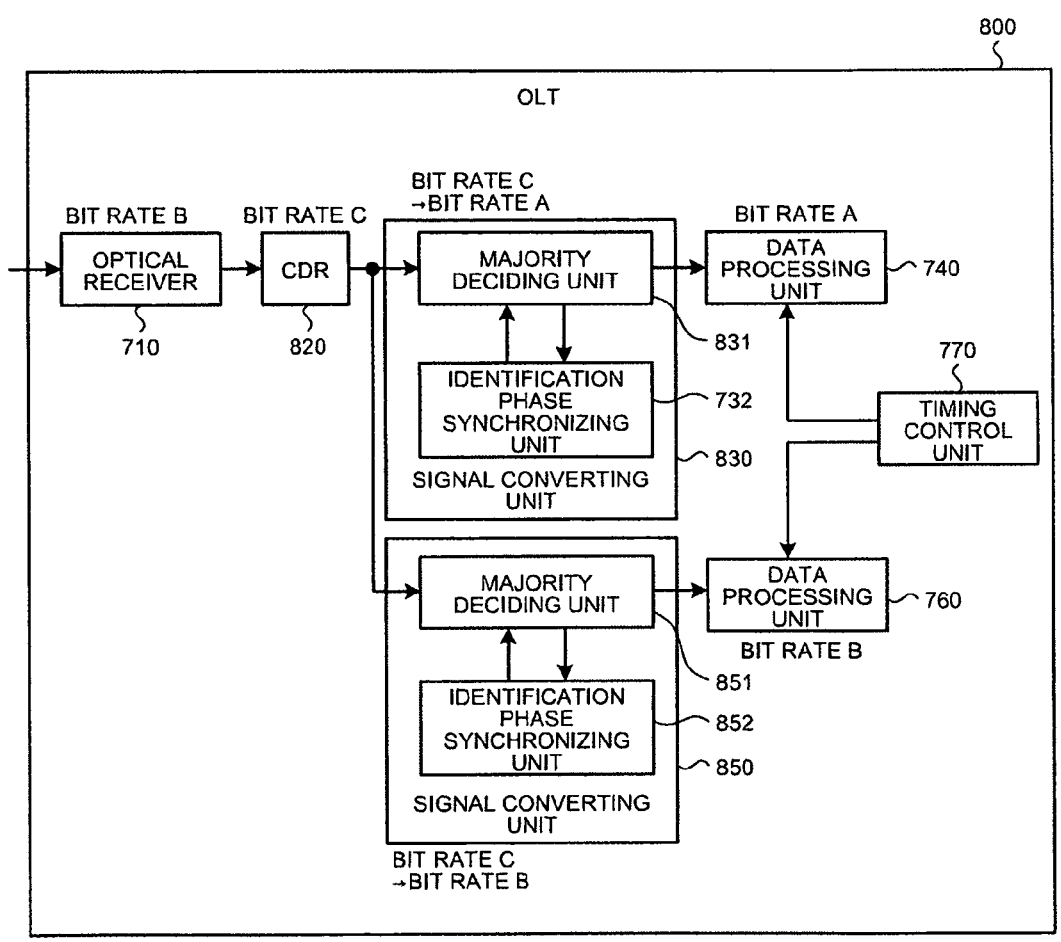
FIG. 18 is an example block diagram of an OLT according to a seventh embodiment.

FIG. 18 is a block diagram of an OLT 800 according to the seventh embodiment. Similar to the OLT 700, the OLT 800 is connected to an optical access network in which signals of the bit rates A and B are transmitted (where the bit rate B is M times faster than the bit rate A). The OLT 800 includes the optical receiver 710, a CDR 820, a signal converting unit 830, the data processing unit 740, a signal converting unit 850, the data processing unit 760, and the timing control unit 770.

The optical receiver 710, the data processing unit 740, the data processing unit 760, and the timing control unit 770 are similar to those of FIG. 17. Therefore, their description is not repeated below. The CDR 820 generates, according to an electrical signal converted by the optical receiver 710, a clock signal to operate the OLT 800 and regenerates a digital signal. More specifically, the CDR 820 regenerates a digital signal of a bit rate C that is N times faster than the bit rate A (where N is an integer multiple of M).

The signal converting unit 830 and the signal converting unit 850 receives a digital signal regenerated by the CDR 820. The signal converting unit 830 converts a digital signal of the bit rate C regenerated by the CDR 820 into a digital signal of the bit rate A to obtain a data signal from an ONU that transmits a data at the bit rate A. The signal converting unit 830 includes a majority deciding unit 831 and an identification phase synchronizing unit 732.

The majority deciding unit 831 converts N bits of signal into one bit of signal while performing error correction by using majority decision logic. Thus, by converting a signal of the bit rate C into a signal of the bit rate A while performing error correction by majority decision, deterioration of receiver sensitivity characteristics due to broadband can be improved. The identification phase synchronizing unit 732 is similar to that of FIG. 17, the same description is not repeated below.

The signal converting unit 850 converts a digital signal of the bit rate C regenerated by the CDR 820 into a digital signal of the bit rate B to obtain a data signal from an ONU that performs data transmission at the bit rate B. The signal converting unit 850 includes a majority deciding unit 851 and an identification phase synchronizing unit 852.

The majority deciding unit 851 converts N/M bits of signal into one bit of signal while performing error correction by using majority decision logic. Thus, by converting a signal of the bit rate C into a signal of the bit rate B while performing error correction by using majority decision logic, deterioration of receiver sensitivity characteristics due to broadband can be improved. The identification phase synchronizing unit 852 is similar to the identification phase synchronizing unit 732 of FIG. 17.

In majority decision, simple majority decision may be used or majority decision assigning a weight to a particular bit may be used. In error correction by majority decision, data is not made redundant as in error correction by FEC and the like. Therefore, the data signal obtaining unit 370 can receive a signal at the bit rate B without any change in the speed.

As described above, according to the seventh embodiment, the CDR 820 regenerates a signal at a bit rate higher than a bit rate of a data signal. Therefore, by applying majority decision, an error rate of a data signal of not only a lower bit rate but also a higher bit rate can be reduced and receiver sensitivity thereof can be improved.

In the above embodiments, examples are described in detail in which an error rate of an OLT that receives a signal containing different bit rates is reduced. In an eighth embodiment, an error rate of an OLT that receives a signal only from an ONU that transmits a signal at lower bit rate is also reduced.

Figure 19:
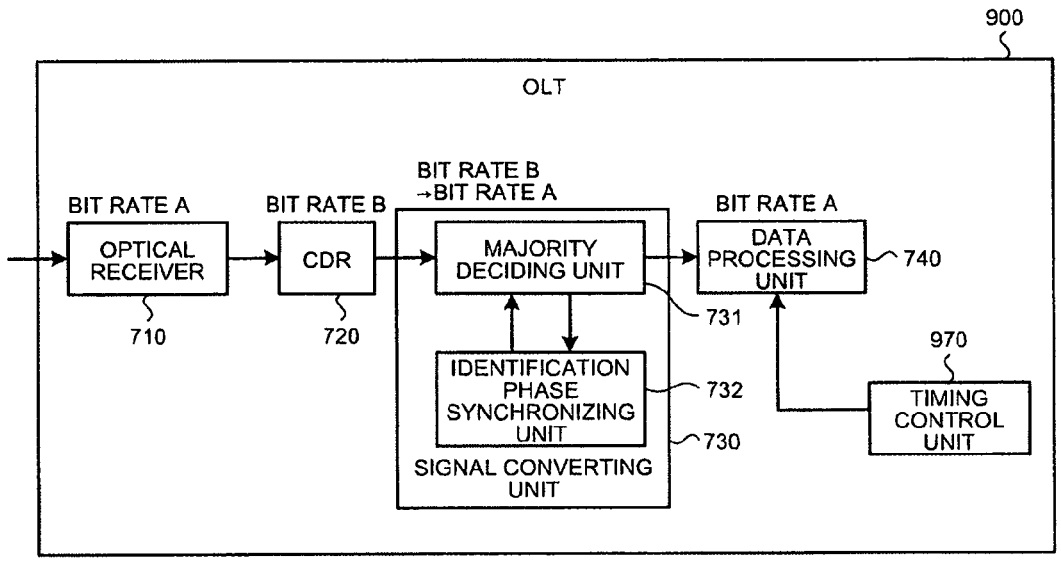
FIG. 19 is an example block diagram of an OLT according to an eighth embodiment.

FIG. 19 is a block diagram of an OLT 900 according to the eighth embodiment. The OLT 900 communicates at the bit rate A, and includes the optical receiver 710, the CDR 720, the signal converting unit 730, the data processing unit 740, and a timing control unit 970.

Comparing the OLT 900 with the OLT 700, the OLT 900 similarly includes the components that improve receiver sensitivity of a data signal of the bit rate A by majority decision. On the other hand, the OLT 900 does not include the error correcting unit 750 and the data processing unit 760 because the OLT 900 is not required to process a data signal of the bit rate B. The timing control unit 770 that specifies a data obtaining timing only to the data processing unit 740 is provided in place of the timing control unit 770.

As described above, according to the eighth embodiment, a data signal is first regenerated at a bit rate higher than the original bit rate thereof and then converted into the original bit rate while performing error correction by majority decision. Therefore, an error rate of an OLT connected to an optical access network composed of only ONUs that support a lower bit rate can also be reduced.

Figure 20:
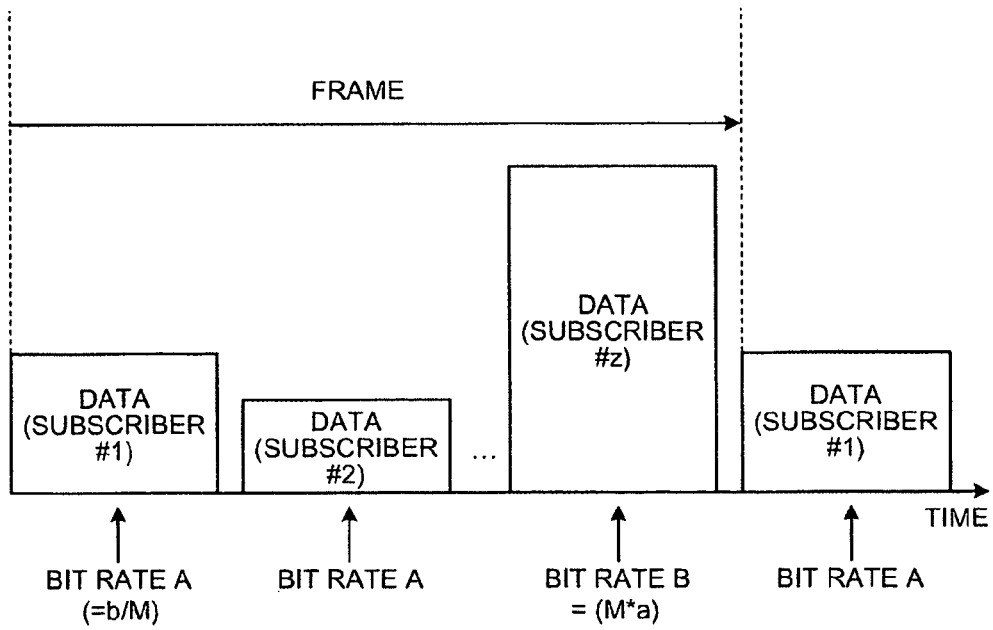
FIG. 20 is an example of an upstream signal in which a bit rate B is not an integer multiple of an bit rate A.

In a ninth embodiment, an approach is described in detail applicable to a case in which the bit rate B is not an integer multiple of the bit rate A as in the example of FIG. 20. In the example of FIG. 20, the bit rate B is not an integer multiple of the bit rate A. Therefore, by performing majority decision on each M bits of signal of a bit rate b, a signal of the bit rate A can be obtained. On the other hand, by performing majority decision on each M bits of signal of the bit rate B, a signal of the bit rate A cannot be obtained.

Figure 21:
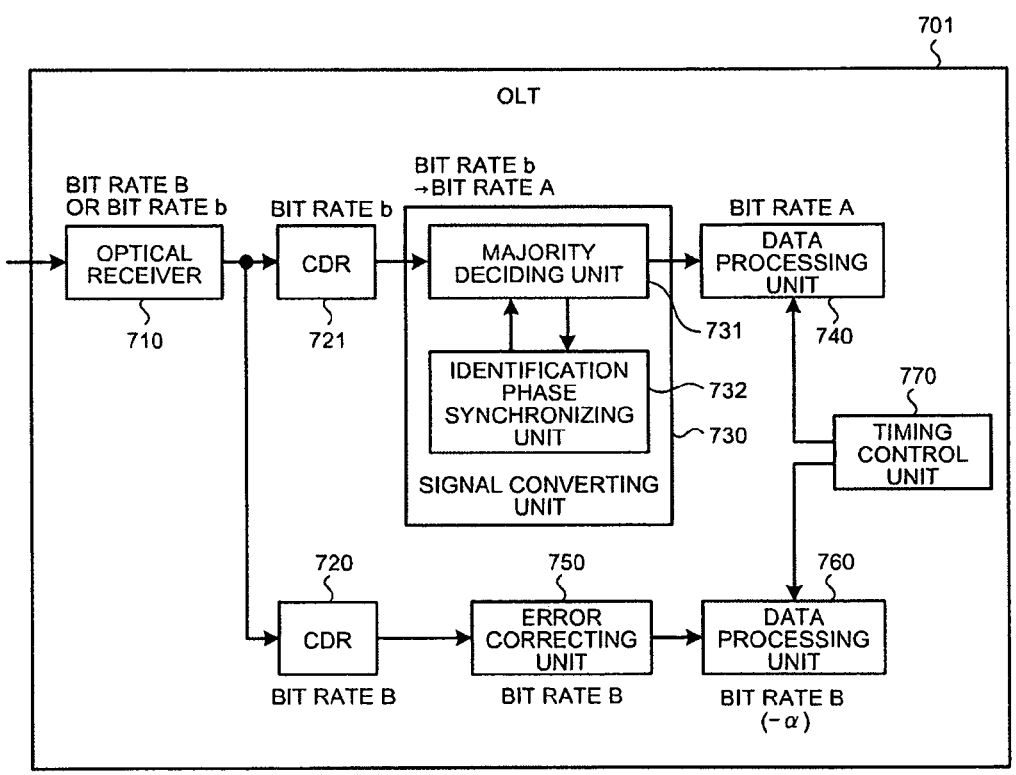
FIG. 21 is an example block diagram of an OLT according to a ninth embodiment.

FIG. 21 is a block diagram of an OLT 701 according to the ninth embodiment. The OLT 701 is a modification of the OLT 700 in the sixth embodiment. The OLT 701 is configured to be applicable to the case where the bit rate B is not an integer multiple of the bit rate A, and further includes a CDR 721. The CDR 721 generates, according to an electrical signal converted by the optical receiver 710, a clock signal to operate the OLT 701 and regenerates a digital signal.

The CDR 720 regenerates, according to a signal output by the optical receiver 710, a signal in synchronization with the bit rate B and outputs the signal thus regenerated thereby to the error correcting unit 750. On the other hand, the CDR 721 regenerates, according to a signal output by the optical receiver 710, a signal in synchronization with the bit rate b and outputs the signal thus regenerated thereby to the majority deciding unit 731. Therefore, the majority deciding unit 731 can perform majority decision on every M bits of input signal and generate a signal of the bit rate A. By using a CDR that can synchronize with both a signal of the bit rate B and a signal of the bit rate b, the CDR 720 and the CDR 721 can be alternated.

As described above, according to the ninth embodiment, the CDR 721 that regenerates a signal of the bit rate b (where the bit rate b is M times faster than the bit rate A) is provided in addition to the CDR 720 that regenerates a signal of the bit rate B. Therefore, an error rate of a signal of a lower bit rate can be reduced by majority decision even if the bit rate B is not an integer multiple of the bit rate A.

Figure 22:
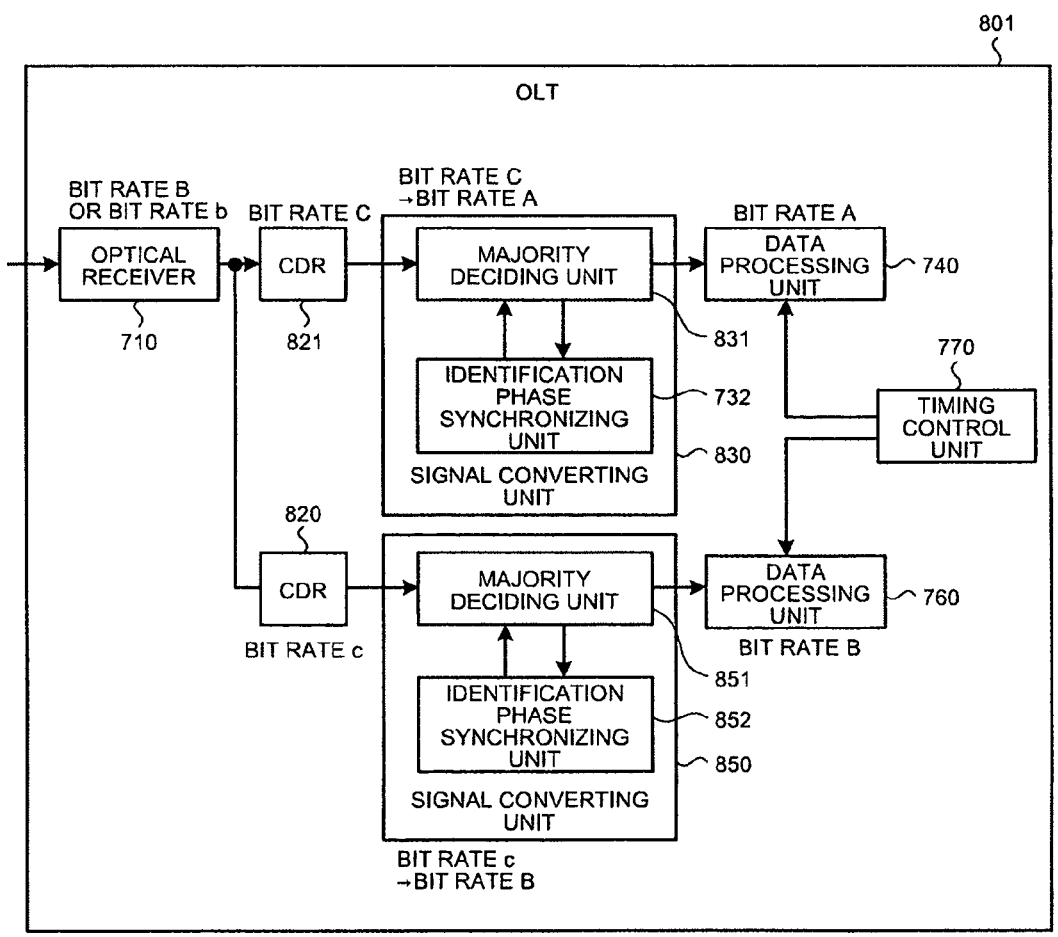
FIG. 22 is an example block diagram of another OLT according to the ninth embodiment.

The ninth embodiment describes in detail a modification of the OLT 700 in the sixth embodiment. The ONU in the other embodiments is also applicable to the case where the bit rate B is not an integer multiple of the bit rate A. For example, if the OLT 800 is further provided with a CDR 821 as in the OLT 801 illustrated in FIG. 22, the OLT 800 is applicable also to the case where the bit rate B is not an integer multiple of the bit rate A.

The specific mode of separation and integration of the above constituent elements is not limited to the ones illustrated in the embodiments, and they can be arbitrarily separated or integrated either functionally or physically. For example, the intersymbol interference removing unit in the third embodiment can be provided with the ONUs and the OLTs in the other embodiments.

As set forth hereinabove, according to one aspect, a transmitted signal is regenerated at a bit rate higher than the original bit rate thereof, and a plurality of bits is combined and analyzed to convert the bits to a low-speed signal of one bit. Therefore, an error rate of the low-speed signal can be reduced and receiver sensitivity of the signal can be improved.

In another aspect, a received signal is regenerated at the same bit rate as the high-speed signal. Therefore, the bit rate of the high-speed signal does not need to be converted, and thus, the structure of the apparatus can be simplified.

In still another aspect, a value of a signal is determined by majority decision when a plurality of bits are combined into a signal of one bit. Therefore, an error rate of the signal can be reduced and receiver sensitivity of the signal can be improved.

In still another aspect, when a majority decision is performed, a weight can be assigned to a bit in which an error is less likely to occur. Therefore, an error rate of a signal can be further reduced and receiver sensitivity thereof can be further improved.

In still another aspect, the verification of synchronization timing is carried out to all the candidates thereof concurrently in parallel. Therefore, the correct synchronization timing can be quickly detected.

In still another aspect, intersymbol interference is removed from a signal prior to regeneration thereof. Therefore, an error rate of a signal can be reduced and receiver sensitivity thereof can be improved.

In still another aspect, error correction of a high-speed signal is performed by using an error correction code. Therefore, an error rate of a high-speed signal can be reduced and receiver sensitivity thereof can be improved.

In still another aspect, a means is provided for regenerating a transmitted signal at the bit rate of the high-speed signal or at a bit rate that is an integer multiple of the bit rate of the high-speed signal. Therefore, both the high-speed signal and the low-speed signal can be correctly regenerated even if the bit rate of the higher speed signal is not an integer multiple of the bit rate of the lower speed signal.

In still another aspect, timing for obtaining data signal is not obtained from a regenerated signal. Timing for obtaining a data signal is decided according to a control signal different from a regenerated signal. Therefore, a data signal can be obtained at the correct timing even if a regenerated signal does not contain information that specifies timing for obtaining a data signal.

In still another aspect, the bit rate of the high-speed signal is an integer multiple of that of the low-speed signal. Thus, after regeneration of a transmitted signal at the same bit rate as the high-speed signal by using a single regeneration signal regenerating unit, the low-speed signal can be easily generated from the regenerated signal. This eliminates the need for a plurality of regeneration signal regenerating units, and the structure of the communication terminal apparatus can be simplified.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication apparatus that receives a signal through a line, more than one signal being transmitted through the line and each including a management signal of a bit rate A and a data signal of a bit rate A B, the communication apparatus comprising:
 a signal receiving unit that receives a signal including a management signal of the bit rate A and a data signal of the bit rate B;
 a signal regenerating unit that generates a first management signal of a bit rate C from the received management signal of the bit rate A, where C=A×N, N being a natural number;
 an identification phase synchronizing unit that synchronizes the first management signal of the bit rate C with the received management signal of the bit rate A; and
 a signal converting unit that analyzes the first management signal of the bit rate C, and creates a second management signal by converting N bits of the first management signal to one bit of the second management signal by majority decision.

2. The communication apparatus according to claim 1, wherein B=A×M, the signal regenerating unit generates a first data signal of the bit rate C from the received data signal of the bit rate B,
 the communication apparatus further comprising:
 a second identification phase synchronizing unit that synchronizes the first data signal of the bit rate C with the received data signal of the bit rate B; and
 a second signal converting unit that analyzes the first data signal of the bit rate C, and creates a second data signal of the bit rate B by converting L bits of the first data signal of the bit rate C to one bit of the second data signal of the bit rate B, where L=N/M.

3. The communication apparatus according to claim 1, further comprising a second signal regenerating unit that generates a signal of the bit rate B from the received signal.

4. The communication apparatus according to claim 1, further comprising:
 a second signal regenerating unit that generates a first data signal of a bit rate c from the received data signal of the bit rate B, where c=B×L;
 a second identification phase synchronizing unit that synchronizes the first data signal of the bit rate c with the received data signal of the bit rate B; and
 a second signal converting unit that analyzes the first data signal of the bit rate c, and creates a second data signal of the bit rate B by converting L bits of the first data signal of the bit rate c to one bit of second data signal of the bit rate B.

5. The communication apparatus according to claim 1, further comprising an error correcting unit that performs error correction on the received data signal with an error correction code.

6. The communication apparatus according to claim 1, wherein the signal converting unit converts N bits of the first management signal to one bit of the second management signal by majority decision.

7. The communication apparatus according to claim 1, wherein the signal converting unit converts N bits of the first management signal to one bit of the second management signal by performing majority decision after weighting each bit.

8. The communication apparatus according to claim 2, wherein the second signal converting unit converts L bits of the first data signal to one bit of the second data signal by majority decision.

9. The communication apparatus according to claim 4, wherein the second signal converting unit converts L bits of the first data signal to one bit of the second data signal by majority decision.

10. The communication apparatus according to claim 2, wherein the second signal converting unit converts L bits of the first data signal to one bit of the second data signal by performing majority decision after weighting each bit.

11. The communication apparatus according to claim 4, wherein the second signal converting unit converts L bits of the first data signal to one bit of the second data signal by performing majority decision after weighting each bit.

12. The communication apparatus according to claim 1, further comprising an intersymbol interference removing unit that removes intersymbol interference from the signal input to the signal regenerating unit by increasing a decision level of 0/1 after a signal corresponding to "1" is received, and by decreasing the decision level of 0/1 after a signal corresponding to "0" is received.

13. The communication apparatus according to claim 1, further comprising:

a timing control unit that controls timing for obtaining the received data signal of each bit rate according to a timing control signal; and a data signal obtaining unit that obtains the received data signal from the received signal obtained by the signal converting unit according to timing control of the timing control unit.

14. The communication apparatus according to claim 1 further comprising a signal regenerating unit that generates first signal of the bit rate C including the first management signal of the bit rate C and the first data signal of the bit rate B from the received signal, where C=A×N;

a management signal converting unit that analyzes the first management signal, and creates second management signal by converting N bits of the first management signal to one bit of the second management signal;

a timing control unit that controls timing for obtaining a data signal destined for the communication terminal apparatus based on the second management signal; and a data signal obtaining unit that obtains the first data signal from the first signal according to timing control of the timing control unit.

15. The communication apparatus according to claim 14, wherein, in the communication terminal apparatus, the management signal converting unit compares a sequence of signals converted by shifting synchronization timing with a predetermined signal pattern, and creates by converting the first management signal to one bit of the second management signal at synchronization timing at which a sequence of signals matches the signal pattern.

16. A signal receiving method applied to a communication apparatus that receives a signal through a line, more than one signal being transmitted through the line and each including a management signal of a bit rate A and a data signal of a bit rate A or B, the signal receiving method comprising:

receiving a signal including a management signal of the bit rate A and a data signal of the bit rate B;

generating a first management signal of a bit rate C from the received management signal of the bit rate A, where C=A×N, N being a natural number;

synchronizing the first management signal of the bit rate C with the received management signal of the bit rate A; and converting, by analyzing the first management signal of the bit rate C, and creating a second management signal by converting N bits of the first management signal to one bit of the second management signal by majority decision.

17. The signal receiving method according to claim 16, wherein B=A×M, the generating generates a first data signal of the bit rate C from the received data signal of the bit rate B, the signal receiving method further comprising:

second synchronizing the first data signal of the bit rate C with the received data signal of the bit rate B; and second converting, by analyzing the first data signal of the bit rate C, and creating a second data signal of the bit rate B by converting L bits of the first data signal of the bit rate C to one bit of the second data signal of the bit rate B, where L=N/M.

18. The signal receiving method according to claim 16, further comprising second generating a signal of the bit rate B from the received signal.

19. The signal receiving method according to claim 16, further comprising:

second generating a first data signal of a bit rate c from the received data signal, where c=B×L;

second synchronizing the first data signal of the bit rate c with the received data signal of the bit rate B; and second converting, by analyzing the first data signal of the bit rate c, and creating a second data signal of the bit rate B by converting L bits of the first data signal of the bit rate c to one bit of second data signal of the bit rate B.

20. The signal receiving method according to claim 16 further comprising:

generating a waveform transmitted through the line as a signal of a bit rate C, where C=A×N;

first converting, by analyzing the signal regenerated at the regenerating, N bits of the signal into the management signal of one bit;

controlling timing for obtaining a data signal destined for the communication terminal apparatus based on the management signal obtained at the first converting; and obtaining the data signal from the signal generated at the regenerating according to timing control at the controlling.

* * * * *

UNITED STATES PATENT AND TRADEMARK OFFICE
CERTIFICATE OF CORRECTION

| | |
|---|---|
| PATENT NO. | : 8,422,612 B2 |
| APPLICATION NO. | : 12/382680 |
| DATED | : April 16, 2013 |
| INVENTOR(S) | : Satoshi Ide et al. |

Page 1 of 1

It is certified that error appears in the above-identified patent and that said Letters Patent is hereby corrected as shown below:

In the Claims:

Column 15, Line 51, In Claim 1, delete "bit rate A B," and insert -- bit rate B, --, therefor.

Signed and Sealed this
Tenth Day of September, 2013

Teresa Stanek Rea
*Acting Director of the United States Patent and Trademark Office*